United States Patent
Kashalikar et al.

(10) Patent No.: US 11,200,215 B2
(45) Date of Patent: Dec. 14, 2021

(54) DATA QUALITY EVALUATION

(71) Applicant: INTERNATIONAL BUSINESS MACHINES CORPORATION, Armonk, NY (US)

(72) Inventors: Kunjavihari Madhav Kashalikar, Hudson, MA (US); Yannick Saillet, Stuttgart (DE); Ketki Ramesh Purandare, Tyngsboro, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 16/777,245

(22) Filed: Jan. 30, 2020

(65) Prior Publication Data

US 2021/0240677 A1  Aug. 5, 2021

(51) Int. Cl.
| | |
|---|---|
| *G06F 16/21* | (2019.01) |
| *G06F 16/215* | (2019.01) |
| *G06F 16/2455* | (2019.01) |
| *G06N 5/02* | (2006.01) |
| *G06F 16/22* | (2019.01) |
| *G06Q 10/10* | (2012.01) |

(52) U.S. Cl.
CPC .......... *G06F 16/215* (2019.01); *G06F 16/221* (2019.01); *G06F 16/2456* (2019.01); *G06N 5/025* (2013.01); *G06Q 10/10* (2013.01)

(58) Field of Classification Search
CPC .................................................. G06F 16/215
USPC ......................................................... 707/737
See application file for complete search history.

(56) References Cited

U.S. PATENT DOCUMENTS

| | | | |
|---|---|---|---|
| 8,812,411 B2 | 8/2014 | Malka et al. | |
| 2005/0114369 A1* | 5/2005 | Gould | G06F 16/2365 |
| 2005/0182739 A1 | 8/2005 | Dasu et al. | |
| 2012/0066214 A1* | 3/2012 | Nelke | G06F 16/258 707/723 |
| 2013/0117203 A1* | 5/2013 | Malka | G06N 5/04 706/12 |
| 2015/0019303 A1* | 1/2015 | Rao | G06Q 10/06395 705/7.41 |
| 2020/0302122 A1* | 9/2020 | Lai | G06F 16/256 |

* cited by examiner

*Primary Examiner* — Syling Yen
(74) *Attorney, Agent, or Firm* — William Hartwell; Andrew D. Wright; Roberts Calderon Safran & Cole, P.C.

(57) ABSTRACT

Methods and systems for data quality evaluation are disclosed. A method includes: receiving, by a computing device, at least one data set and a list of rule expressions to bind; building, by the computing device, candidate binding combinations between columns of the at least one data set and variables of each rule expression in the list of rule expressions; building, by the computing device, a new bound rule expression candidate based on the candidate binding combinations; generating, by the computing device, a new bound rule expression based on the new bound rule expression candidate and a data transformation applied to at least one of the columns of the at least one data set; and storing, by the computing device, the new bound rule expression.

20 Claims, 11 Drawing Sheets

700

| Term | Column |
|---|---|
| First Name | First Name |
| Last Name | LName |
| Zip Code | Code |

710

IF FirstName EXISTS AND len(trim(FirstName)) > 0 THEN FirstName MATCHES_REGEX '^[A-Za-z\-\p{L}\p{Zs}\p{Lu}\p{Ll}\p{M}\']+'

IF LastName EXISTS AND len(trim(LastName)) > 0 THEN LastName MATCHES_REGEX '^[A-Za-z\-\p{L}\p{Zs}\p{Lu}\p{Ll}\p{M}\']+'

ZipCode IN_REFERENCE_COLUMN MasterZipCode

| Data Class | Column |
|---|---|
| ID | Idnumber |
| Zipcode | zip |
| Country Code | CC |

810

ID > 1000000 AND ID < 999999999 AND len(tostring(ID,'%i')) = 9

CountryCd EXISTS AND len(trim(CountryCd)) <> 0

| Data Class | Column |
|---|---|
| Attribute_One | A1 |
| Attribute_Two | Attribute_Two |
| Country | CC |
| State | state |

910

IF Attribute_Two < A2_Value_One THEN
Attribute_One = 'A1_Value_One'

IF Country = "USA" THEN State IN
USStateCodes

| Term | Policy |
|---|---|
| ID | ID must exist and must be unique |
| Country Code | Country Code must not be null |

1010

| Policy | Rule Expression |
|---|---|
| ID must exist and must be unique | IsUnique, Not Null |
| Country Code must not be null | Not Null |

| Rule Expression | Binding Logic | Columns | Comment |
|---|---|---|---|
| Age In Range Num | Age > 18 | Col1,col2,col3 | Applies to integer columns |
| Age In Range String | ToString(Age) > 18 | Col4,col5,col6 | Applies to string columns |
| Age In Range DOB | ToString(today-Age) > 18 | Col7,col8,col9 | Applies to column of type Date (Date of Birth) |

FIG. 11

DATA QUALITY EVALUATION

BACKGROUND

Aspects of the present invention generally relate to computing devices and, more particularly, to methods and systems for data quality evaluation.

The context of data may be used to determine criteria to apply to the data to assess data quality. In order to evaluate data quality, data quality rules which represent business requirements may be created. Data quality rules are logical expressions (data rule expressions) that can be applied to data to validate that the data meet requirements set by a business. Data quality rules may be applied at initial onboarding of data in an enterprise, whenever characteristics of data or its business context changes, and/or when data is transformed as it moves within the enterprise.

In conventional systems, validation of data through the application of data quality rules is a manual process that may be time consuming and error prone. In particular, applying a data rule expression to a column or group of columns in a database or other data repository may be performed manually. Conventional systems may not be able to apply appropriate data quality rules automatically. For example, a data rule expression applicable to a column under evaluation may not be automatically determined because there may not be a direct correlation (mapping) between a variable used in a rule expression and a business context of data. In many cases, a data rule expression is generic, and the type of data may change from one instance to another. Data stored in a dataset (e.g., data in a column in a database) may not be in the format expected by a rule expression, or data may need to be transformed to derive a value that can be bound to the rule expression (e.g., a rule expression has the variable "age", but the data stored in a column is "date of birth"). Additionally, the form of data in a data repository may change. For these and other reasons, data may require transformation in order to apply a data rule expression.

SUMMARY

In a first aspect of the invention, there is a method that includes: receiving, by a computing device, at least one data set and a list of rule expressions to bind; building, by the computing device, candidate binding combinations between columns of the at least one data set and variables of each rule expression in the list of rule expressions; building, by the computing device, a new bound rule expression candidate based on the candidate binding combinations; generating, by the computing device, a new bound rule expression based on the new bound rule expression candidate and a data transformation applied to at least one of the columns of the at least one data set; and storing, by the computing device, the new bound rule expression. This aspect of the invention addresses the above-mentioned shortcomings associated with conventional data quality evaluation by automatically determining an appropriate data quality evaluation to be performed on a given dataset.

In another aspect of the invention, there is a computer program product that includes one or more computer readable storage media, and program instructions collectively stored on the one or more computer readable storage media. The program instructions include: program instructions to receive at least one data set and a list of rule expressions to bind; program instructions to build candidate binding combinations between columns of the at least one data set and variables of each rule expression in the list of rule expressions based on similarities between names of the variables of each rule expression in the list of rule expressions and names of the columns of the at least one data set; program instructions to build a new bound rule expression candidate based on the candidate binding combinations; program instructions to generate a new bound rule expression based on the new bound rule expression candidate and a data transformation applied to at least one of columns of the at least one data set; and program instructions to evaluate the new bound rule expression against data stored in the at least one data set. This aspect of the invention addresses the above-mentioned shortcomings associated with conventional data quality evaluation by automatically determining an appropriate data quality evaluation to be performed on a given dataset.

In another aspect of the invention, there is a system that includes: a processor, a computer readable memory, one or more computer readable storage media, and program instructions collectively stored on the one or more computer readable storage media, the program instructions executable to: receive at least one data set and a list of rule expressions to bind; build candidate binding combinations between columns of the at least one data set and variables of each rule expression in the list of rule expressions; build a new bound rule expression candidate based on the candidate binding combinations; generate a new bound rule expression based on the new bound rule expression candidate and a suggested data transformation to apply to at least one of the columns of the at least one data set that is determined based on a past binding of a same variable in the new bound rule expression to the at least one of the columns of the at least one data set; and store the new bound rule expression. This aspect of the invention addresses the above-mentioned shortcomings associated with conventional data quality evaluation by automatically determining an appropriate data quality evaluation to be performed on a given dataset.

In an optional aspect of the invention, the new bound rule expression is evaluated against data stored in the at least one data set. In another optional aspect of the invention, primary key to foreign key relationships are discovered in the at least one data set. In another optional aspect of the invention, the building the candidate binding combinations between the columns of the at least one data set and the variables of each rule expression in the list of rule expressions includes determining, by the computing device, similarities between names of the variables of each rule expression in the list of rule expressions and names of the columns of the at least one data set. In another optional aspect of the invention, the building the candidate binding combinations between the columns of the at least one data set and the variables of each rule expression in the list of rule expressions includes determining, by the computing device, similarities between names of terms associated with the columns of the at least one data set and names of the variables of each rule expression in the list of rule expressions. In another optional aspect of the invention, the building the candidate binding combinations between the columns of the at least one data set and the variables of each rule expression in the list of rule expressions includes determining, by the computing device, similarities between names of classes associated with the columns of the at least one data set and names of the variables of each rule expression in the list of rule expressions. These optional aspects of the invention address the above-mentioned shortcomings by identifying possible data quality evaluations (rule expressions) that may be applied to a given column in a dataset.

In another optional aspect of the invention, the building the candidate binding combinations between the columns of the at least one data set and the variables of each rule expression in the list of rule expressions includes determining, by the computing device, associations of the columns of the at least one data set with same terms as policies associated with rule expressions in the list of rule expressions. In another optional aspect of the invention, the building the candidate binding combinations between the columns of the at least one data set and the variables of each rule expression in the list of rule expressions includes determining, by the computing device, an association of a first one of the columns of the at least one data set with a same term as a second one of the columns of the at least one data set that is already bound to a variable in a rule expression in the list of rule expressions. In another optional aspect of the invention, the building the candidate binding combinations between the columns of the at least one data set and the variables of each rule expression in the list of rule expressions includes determining, by the computing device, similarities between a name of a first one of the columns of the at least one data set and a name of a second one of the columns of the at least one data set that is already bound to a variable in a rule expression in the list of rule expressions. In another optional aspect of the invention, the building the candidate binding combinations between the columns of the at least one data set and the variables of each rule expression in the list of rule expressions includes determining, by the computing device, similarities between data of a first one of the columns of the at least one data set and data of a second one of the columns of the at least one data set that is already bound to a variable in a rule expression in the list of rule expressions. In another optional aspect of the invention, the data transformation is determined using a fingerprint of at least one of the columns of the at least one data set and a fingerprint of a previously bound column. These optional aspects of the invention address the above-mentioned shortcomings by identifying possible data quality evaluations (rule expressions) that may be applied to a given column in a dataset.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIGS. 7, 8, 9, 10, and 11 depict examples in accordance with aspects of the invention.

DETAILED DESCRIPTION

Figure 1:
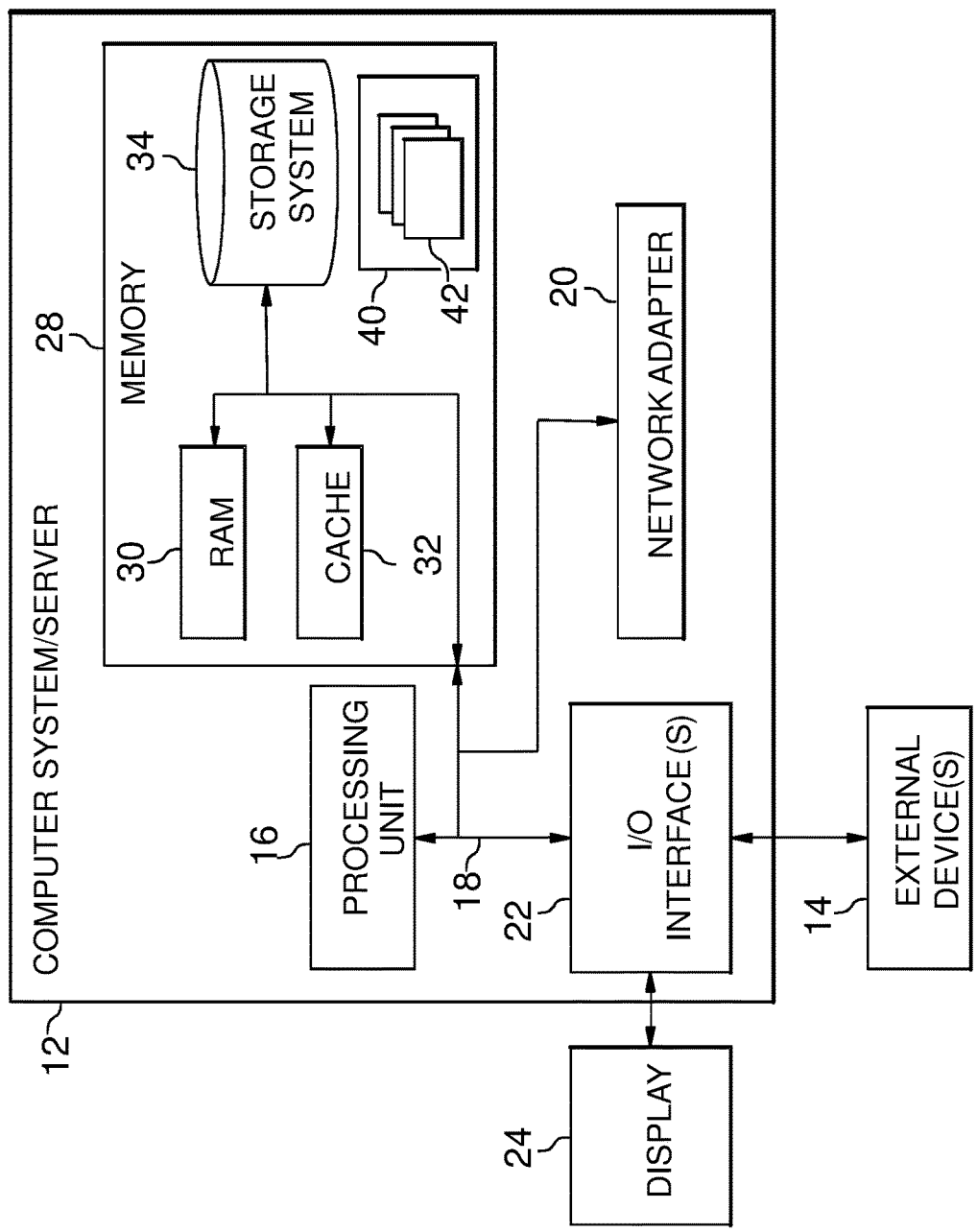
FIG. 1 depicts a computer system in accordance with aspects of the invention.

Aspects of the present invention generally relate to computing devices and, more particularly, to methods and systems for data quality evaluation. As described herein, aspects of the invention include a method and system for automatically determining an appropriate data quality evaluation to be performed on a given dataset. Additionally, as described herein, aspects of the invention include a method and system for identifying possible data quality evaluations (rule expressions) that may be applied to a given column in a dataset using business classification, data classification, name similarity, and/or triangulation of a rule, a policy, and a term based on past application of a rule expression to a given column with shared term assignment and applicable policy. Additionally, as described herein, aspects of the invention include a method and system for narrowing down and identifying a rule expression to be applied to data using clusters of columns with similar characteristics and rule expressions associated with those columns. Additionally, as described herein, aspects of the invention include a method and system that enhances over time as humans provide input and increase the available knowledge within the system.

Embodiments address the problems with application of data quality rules by providing methods and systems for data quality evaluation. In particular, embodiments improve the functioning of a computer by providing methods and systems for automatically determining an appropriate data quality evaluation to be performed on a given dataset. Additionally, embodiments improve the functioning of a computer by providing methods and systems for identifying possible data quality evaluations (rule expressions) that may be applied to a given column in a dataset using business classification, data classification, name similarity, and/or triangulation of a rule, a policy, and a term based on past application of a rule expression to a given column with shared term assignment and applicable policy. Additionally, embodiments improve the functioning of a computer by providing methods and systems for narrowing down and identifying a rule expression to be applied to data using clusters of columns with similar characteristics and rule expressions associated with those columns. Accordingly, through the use of rules that improve computer-related technology, implementations of the invention allow computer performance of functions not previously performable by a computer. Additionally, implementations of the invention use techniques that are, by definition, rooted in computer technology (e.g., enterprise data lakes, machine learning, Levenshtein distance, and Apriori and String kernels).

In embodiments, methods and systems for data quality evaluation use a data catalog to identify candidate (suggested) rule expressions. In particular, in an enterprise data lake (data repository) with a data catalog, methods and systems use assigned terms, data classes, and column names to determine an association of a particular column with a rule expression. In embodiments, the assigned term is given the highest priority in such determination. Additionally, embodiments use policies associated with terms and in turn rule expressions applied to columns. For example, in a case where Customer Number has a policy "Customer Number must be unique" and this policy has a Rule Expression "IsUnique", this rule expression is applied to new columns under evaluation.

In embodiments, methods and systems determine all of the columns to which the candidate (suggested) rule expressions apply. In particular, groups of columns are determined where the rule expression is bound as-is. Additionally, groups of columns are determined where rule expression has been bound post transformation of the column, and these columns are further grouped based on the transformation applied. Additionally, methods and systems determine which of the groups above is the best fit for a column under evaluation using a data fingerprint, which characterizes the class of data contained in the corresponding data set (e.g., column). In embodiments, the data fingerprint is computed automatically based on several metrics capturing different aspects of the data (e.g., data type, format, unique values, etc.). Embodiments then bind the rule expression as is or using an applicable transformation.

To the extent the implementations collect, store, or employ personal information of individuals, it should be understood that such information shall be used in accordance with all applicable laws concerning protection of personal information. Additionally, the collection, storage, and use of such information may be subject to advance notification and consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
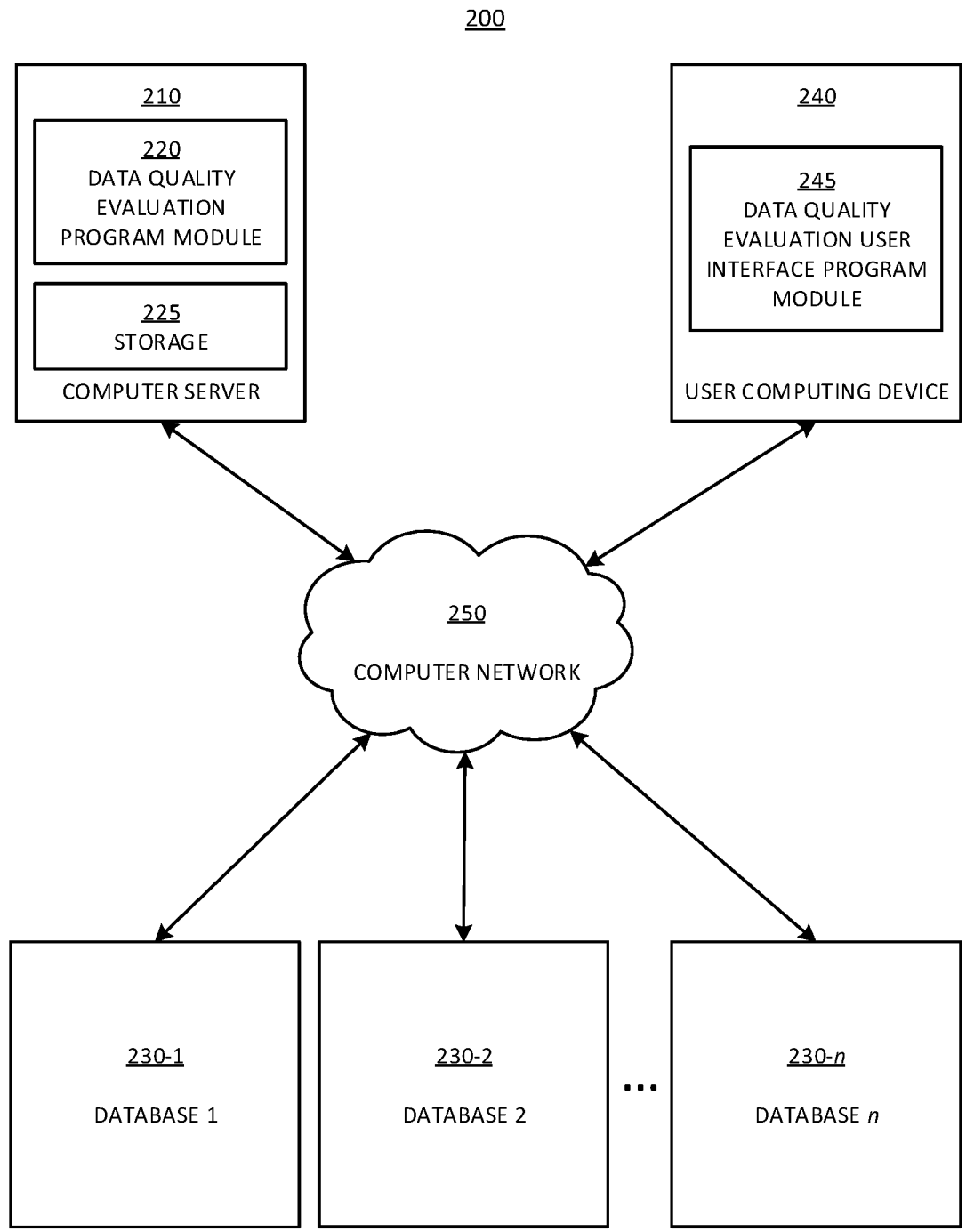
FIG. 2 depicts an illustrative environment in accordance with aspects of the invention.

FIG. 2 depicts an illustrative environment 200 in accordance with aspects of the invention. As shown, the environment 200 comprises a computer server 210, a plurality of databases 230-1, 230-2, . . . , 230-n, and a user computing device 240 which are in communication via a computer network 250. In embodiments, the computer network 250 is any suitable network including any combination of a LAN, WAN, or the Internet. In embodiments, the computer server 210, the plurality of databases 230-1, 230-2, . . . , 230-n, and the user computing device 240 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a data quality evaluation program module 220, which comprises one or more of the program modules 42 shown in FIG. 1. In embodiments, the data quality evaluation program module 220 includes program instructions for automatically determining an appropriate data quality evaluation to be performed on a given dataset stored in one or more of the databases 230-1, 230-2, . . . , 230-n. In embodiments, the program instructions included in the data quality evaluation program module 220 of the computer server 210 are executed by one or more hardware processors. In embodiments, the computer server 210 also includes storage 225.

Still referring to FIG. 2, in embodiments, each of the plurality of databases 230-1, 230-2, . . . , 230-n is a database (e.g., a relational database, non-relational database, or any other type of database) or other data repository that stores data which is evaluated with respect to data quality by the data quality evaluation program module 220 of the computer server 210. In embodiments, each of the plurality of databases 230-1, 230-2, . . . , 230-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

Still referring to FIG. 2, in embodiments, the user computing device 240 is a computer device comprising one or more elements of the computer system/server 12 (as shown in FIG. 1). In other embodiments, the user computing device 240 is a desktop computer, a laptop computer, a mobile device such as a cellular phone, tablet, personal digital assistant (PDA), or other computing device.

In embodiments, the user computing device 240 includes data quality evaluation user interface program module 245, which comprises one or more of the program modules 42 shown in FIG. 1. In embodiments, the data quality evaluation user interface program module 245 includes program instructions for a user interface for the data quality evaluation program module 220 of the computer server 210. In embodiments, the program instructions included in the data quality evaluation user interface program module 245 of the user computing device 240 are executed by one or more hardware processors.

Figure 3:
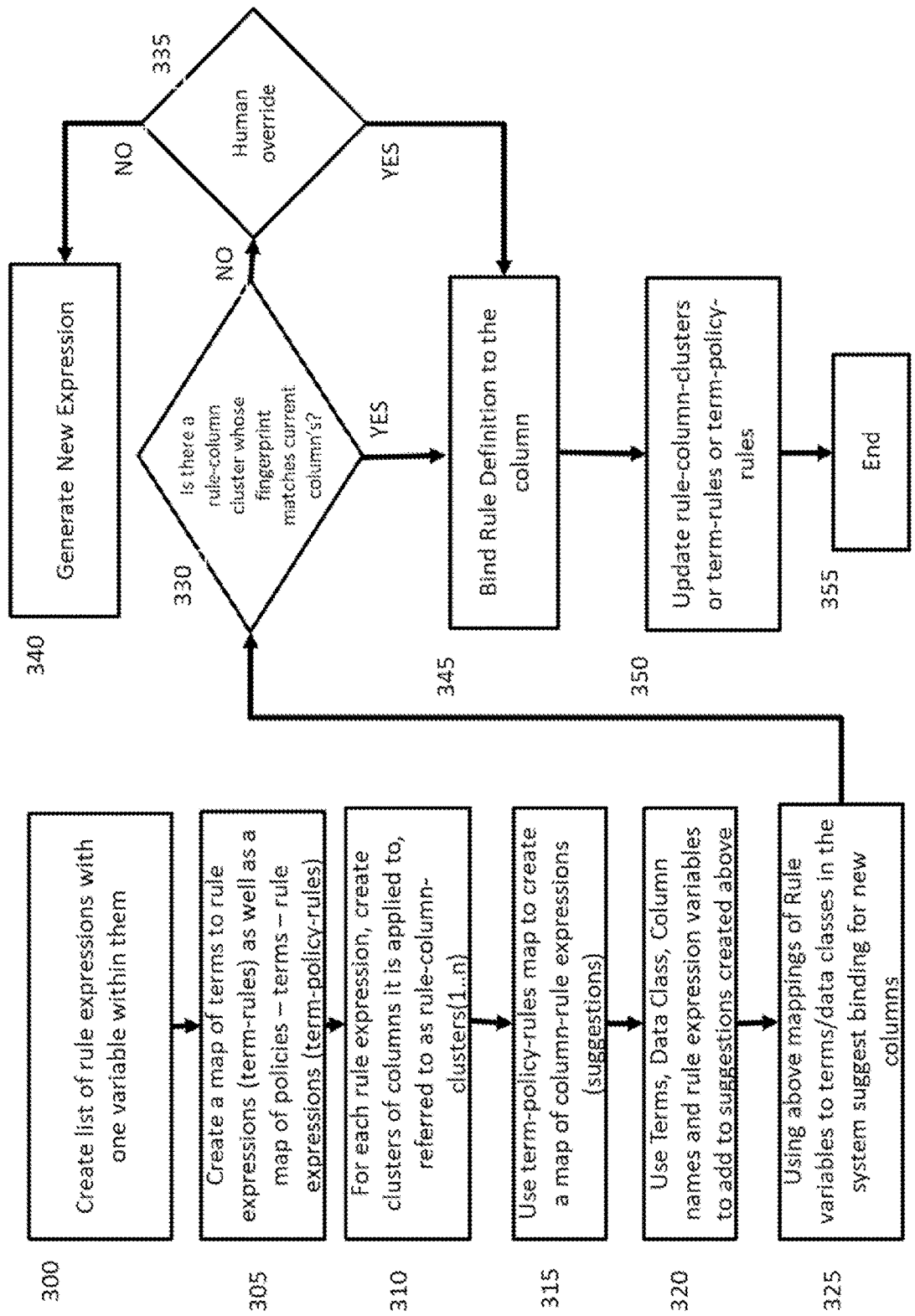
FIGS. 3, 4, 5, and 6 depict flowcharts of exemplary methods performed in accordance with aspects of the invention.

FIG. 3 depicts a flowchart of an exemplary method performed by the data quality evaluation program module 220 of the computer server 210 in accordance with aspects of the invention. The steps of the method are performed in the environment of FIG. 2 and are described with reference to the elements shown in FIG. 2.

At step 300, the computer server 210 creates a list of rule expressions with one variable within them. In embodiments, step 300 comprises the data quality evaluation program module 220 of the computer server 210 creating the list of rule expressions with one variable within them by retrieving rule expressions from the storage 225. In an example, the rule expressions may be rules for validating email addresses, ages, etc.

Still referring to FIG. 3, at step 305, the computer server 210 creates a map of terms to rule expressions (term-rules) as well as a map of policies to terms to rule expressions (term-policy-rules). In embodiments, step 305 comprises the data quality evaluation program module 220 of the computer server 210 creating the map of terms to rule expressions (term-rules) as well as the map of policies to terms to rule expressions (term-policy-rules). In an example, the term is an annotation or tag that describes data (e.g., customer number), and the policy is a business rule (e.g., customer number exists, starts with a "k", is always 9 digits, always ends with a letter, etc.).

Still referring to FIG. 3, at step 310, the computer server 210, for each rule expression, creates clusters of columns to which the rule expression is applied, referred to as rule-column-clusters (1 . . . n). In embodiments, step 310 comprises the data quality evaluation program module 220 of the computer server 210, for each rule expression, creating the clusters of columns (from one or more of the databases 230-1, 230-2, . . . , 230-n) to which the rule expression is (or was previously) applied, referred to as rule-column-clusters (1 . . . n). In particular, in embodiments, in order to create a binding between the rule variables (e.g., from rules stored in the storage 225) and dataset columns (e.g., from one or more of the databases 230-1, 230-2, . . . , 230-n), the data quality evaluation program module 220 first finds the association of the rule variables and dataset columns with business glossary terms and considers the data type of the rule variables and dataset columns or finds the data classes that are associated with the rule variables and dataset columns. In an example, clusters of columns may have been previously applied to rules, and embodiments use machine learning to determine groups of columns that have been previously bound to the same rule definition or variable.

Still referring to step 310, in embodiments, to find the association between the rule variables and terms/data classes, the data quality evaluation program module 220 first obtains a list of all published rule expressions (e.g., from the storage 225) and derives their variables. The data quality evaluation program module 220 then uses a fuzzy matching between variable names and term names to determine if they are related. In embodiments, the data quality evaluation program module 220 also uses data type and patterns to find the data class for the variable. In an example, the data quality evaluation program module 220 determines that there is an association between the term "Age", the expression "age>18", and the variable "age" with a confidence score of 100.

Still referring to step 310, in embodiments, to find the association between the rule variables and terms/data classes, the data quality evaluation program module 220 also uses prior bindings to reverse engineer the relation using a rule-based machine learning method such as Apriori or String kernels. In an example, the variable "FirstName" is bound to the column "FNAME" (from one or more of the databases 230-1, 230-2, . . . , 230-n) and the term assigned to the column is "First Name". Additionally, the variable "FirstName" is bound to the column "NAME" (from one or more of the databases 230-1, 230-2, . . . , 230-n) and the term assigned to the column is "First Name". In embodiments, the data quality evaluation program module 220 stores these intermediate mappings in the system and updates the mappings between rules, terms, and data classes. When a user ingests new tables (e.g., using the data quality evaluation user interface program module 245), the data quality evaluation program module 220 uses these mappings to bind the variables to columns (from one or more of the databases 230-1, 230-2, . . . , 230-n) having same term/data class as well, if they have the same data type. On the other hand, if data types do not match, the data quality evaluation program module 220 provides feedback to a user via the data quality evaluation user interface program module 245 to change the rule expression so that the rule can be applied to the columns of the new dataset (from one or more of the databases 230-1, 230-2, . . . , 230-n).

Still referring to FIG. 3, at step 315, the computer server 210 uses the term-policy-rules map to create a map of column-rule expressions (suggestions). In embodiments, step 315 comprises the data quality evaluation program module 220 of the computer server 210 using the term-policy-rules map created at step 305 to create the map of column-rule expressions (suggestions).

Still referring to FIG. 3, at step 320, the computer server 210 uses the terms, data class, column names, and rule expression variables to add to the suggestions created at step 315. In embodiments, step 320 comprises the data quality evaluation program module 220 of the computer server 210 using the terms, data class, column names, and rule expression variables to add to the suggestions created at step 315.

Still referring to FIG. 3, at step 325, the computer server 210, using the mappings of rule variables to terms/data classes in the system created at step 305, suggests bindings for new columns. In embodiments, step 325 comprises the data quality evaluation program module 220 of the computer server 210 using the terms, data class, column names, and rule expression variables to add to the suggestions created at step 315.

Still referring to FIG. 3, at step 330, the computer server 210 determines whether or not there is a rule-column cluster having a fingerprint that matches a fingerprint of a current column. In embodiments, step 330 comprises the data quality evaluation program module 220 of the computer server 210, for each column from one or more of the databases 230-1, 230-2, . . . , 230-n, determining whether or not there is a rule-column cluster having a fingerprint that matches a fingerprint of the column. In an example, the fingerprints identify characteristics of data (e.g., format, length, number of characters/digits, most common words/values, etc.). If the data quality evaluation program module 220 determines that there is a rule-column cluster having a fingerprint that matches a fingerprint of the column, then the flow proceeds to step 345. On the other hand, if the data quality evaluation program module 220 determines that there is not a rule-column cluster having a fingerprint that matches a fingerprint of the column, then the flow proceeds to step 335.

Still referring to FIG. 3, at step 335, the computer server 210 determines whether or not an instruction is received for a human override. In embodiments, step 335 comprises the data quality evaluation program module 220 of the computer server 210 determining whether or not an instruction is received from the data quality evaluation user interface program module 245 of the user computing device 240 for a human override to bind a rule definition to a column despite the absence of a matching fingerprint. If the data quality evaluation program module 220 determines that the instruction for the human override is received, then the flow proceeds to step 345. On the other hand, if the data quality evaluation program module 220 determines that the instruction for a human override is not received, then the flow proceeds to step 340.

Still referring to FIG. 3, at step 340, the computer server 210 generates a new expression. In embodiments, step 325 comprises the data quality evaluation program module 220 of the computer server 210 generating the new expression by receiving, from the data quality evaluation user interface program module 245 of the user computing device 240, an instruction regarding the new expression (rule definition) to bind to the column, and generating the new expression based on the received instruction.

Still referring to FIG. 3, at step 345, the computer server 210 binds a rule definition to the column. In embodiments, step 345 comprises the data quality evaluation program module 220 of the computer server 210 binding the rule definition associated with the rule-column cluster having a fingerprint that matches the current column (determined at step 330) or the rule definition associated with the human override (at step 335) to the column.

Still referring to FIG. 3, at step 350, the computer server 210 updates the rule-column-clusters or term-rules or term-policy-rules. In embodiments, step 350 comprises the data quality evaluation program module 220 of the computer server 210 updating the rule-column-clusters or term-rules or term-policy-rules based on the rule definition to column binding from step 345. The flow then ends at step 355.

Figure 4:
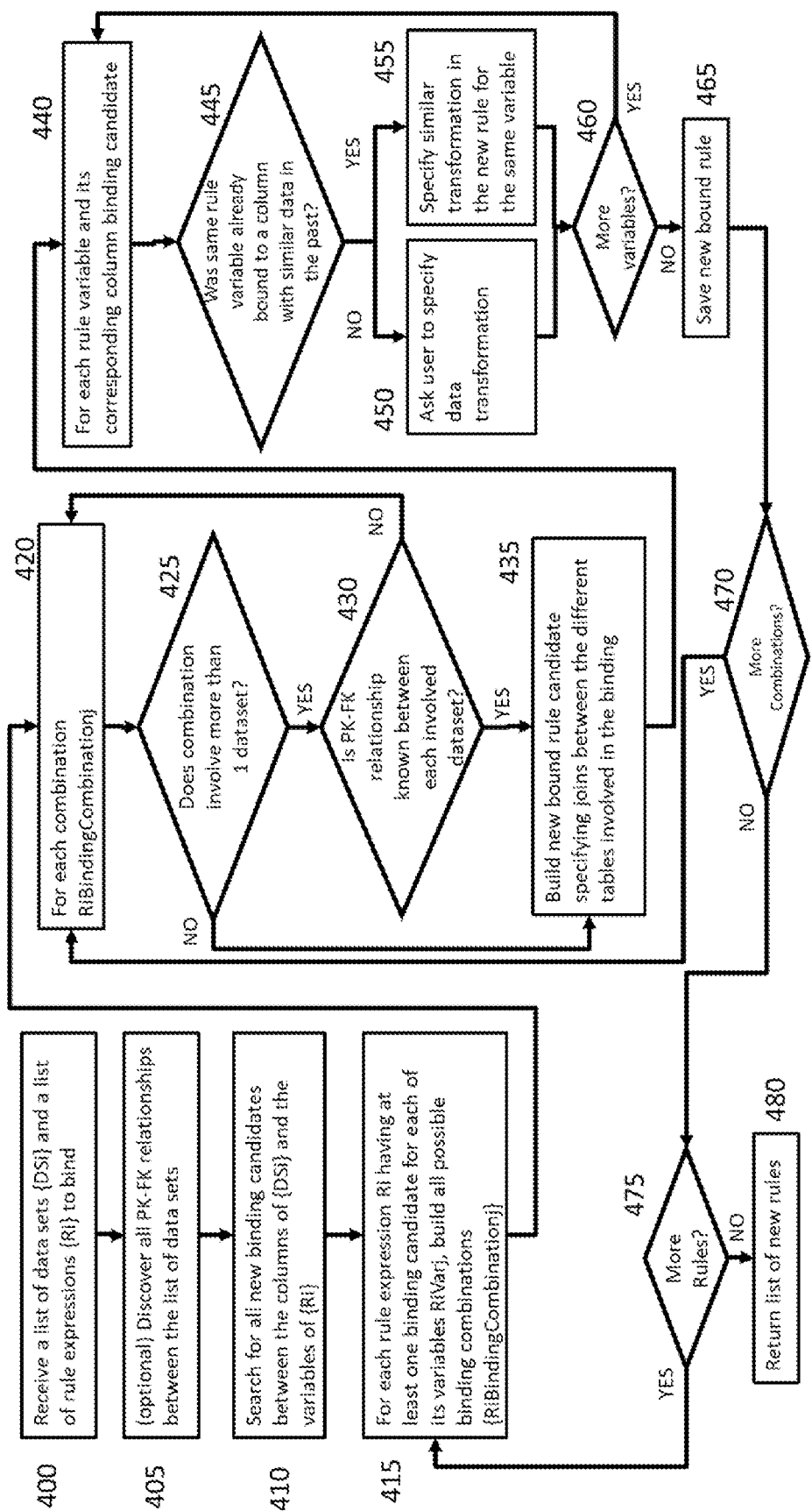

FIG. 4 depicts a flowchart of another exemplary method performed by the data quality evaluation program module 220 of the computer server 210 in accordance with aspects of the invention. The steps of the method are performed in the environment of FIG. 2 and are described with reference to the elements shown in FIG. 2.

At step 400, the computer server 210 receives a list of data sets {DSi} and a list of rule expressions {Ri} to bind. In embodiments, step 400 comprises the data quality evaluation program module 220 of the computer server 210 receiving the list of data sets {DSi} and the list of rule expressions {Ri} to bind.

Still referring to FIG. 4, at step 405, the computer server 210 optionally discovers all primary key (PK) to foreign key (FK) relationships between the list of data sets. In embodiments, step 405 comprises the data quality evaluation program module 220 of the computer server 210 optionally discovering all PK-FK relationships between the list of data sets {DSi} from one or more of the databases 230-1, 230-2, . . . , 230-n.

Figure 5:
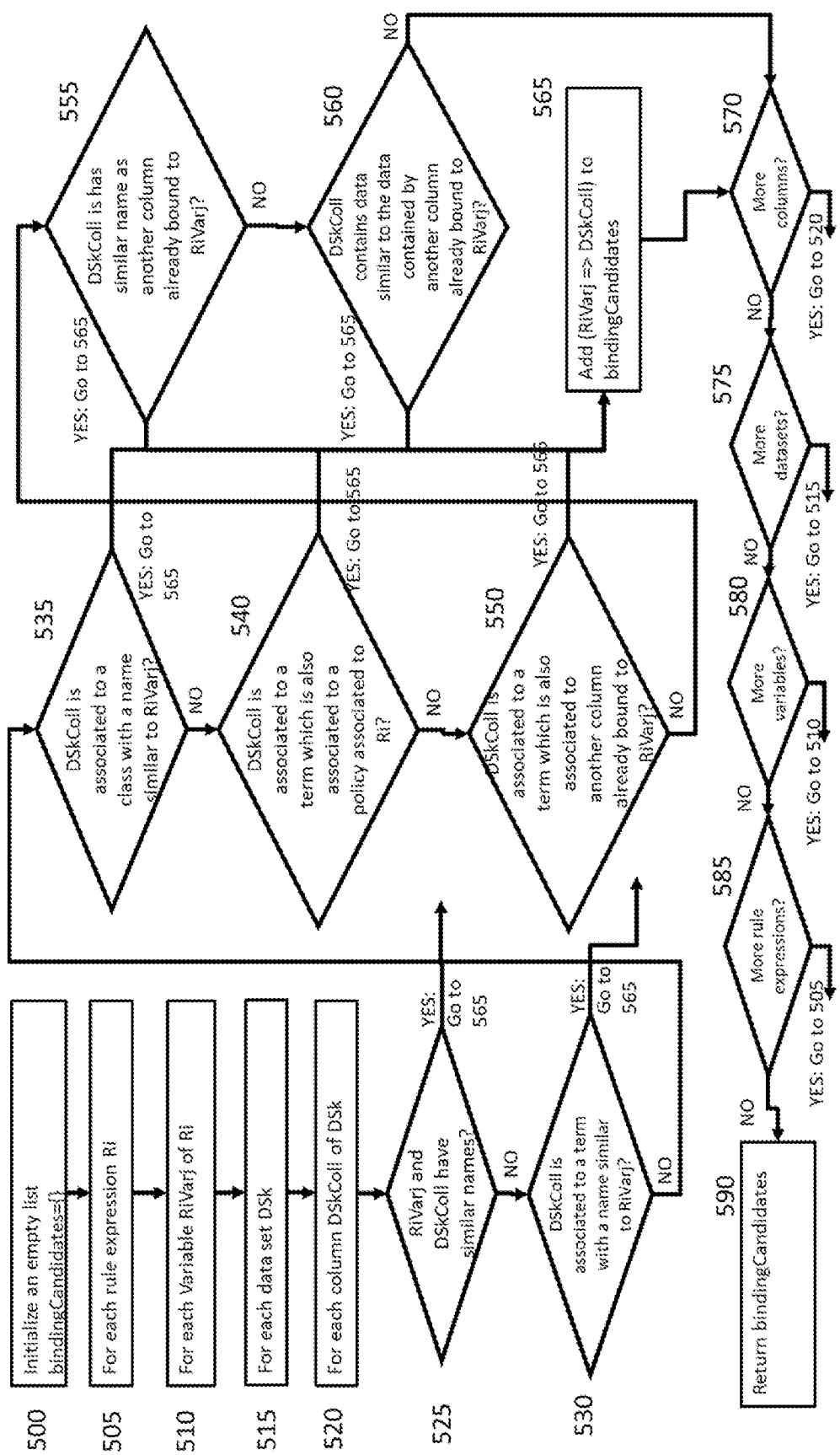

Still referring to FIG. 4, at step 410, the computer server 210 searches for all new binding candidates between the columns of {DSi} and the variables of {Ri}. In embodiments, step 410 comprises the data quality evaluation program module 220 of the computer server 210 searching for all new binding candidates between the columns of {DSi} and the variables of {Ri}, as illustrated in FIG. 5.

Still referring to FIG. 4, at step 415, the computer server 210, selects a next rule expression Ri from the list of rule expressions that has at least one binding candidate for each of its variables RiVarj and builds all possible binding combinations {RiBindingCombinationj}. In embodiments, step 415 comprises the data quality evaluation program module 220 of the computer server 210 selecting a next rule expression Ri from the list of rule expressions that has at least one binding candidate for each of its variables RiVarj and building all possible binding combinations {RiBindingCombinationj}.

Still referring to FIG. 4, at step 420, the computer server 210 selects a next combination RiBindingCombinationj. In embodiments, step 420 comprises the data quality evaluation program module 220 of the computer server 210 selecting the next combination RiBindingCombinationj from the list of all possible binding combinations generated at step 415.

Still referring to FIG. 4, at step 425, the computer server 210 determines whether or not the RiBindingCombinationj selected at step 420 involves more than one dataset. In embodiments, step 425 comprises the data quality evaluation program module 220 of the computer server 210 determining whether or not the RiBindingCombinationj selected at step 420 involves more than one dataset from one or more of the databases 230-1, 230-2, . . . , 230-n. If the data quality evaluation program module 220 determines that the RiBindingCombinationj selected at step 420 involves more than one dataset, then the flow proceeds to step 430. On the other hand, if the data quality evaluation program module 220 determines that the RiBindingCombinationj selected at step 420 does not involve more than one dataset, then the flow proceeds to step 435.

Still referring to FIG. 4, at step 430, the computer server 210 determines whether or not the PK-FK relationship is known between each involved dataset. In embodiments, step 430 comprises the data quality evaluation program module 220 of the computer server 210 determining whether or not the PK-FK relationship is known between each involved dataset. If the data quality evaluation program module 220 determines that the PK-FK relationship is known between each involved dataset, then the flow proceeds to step 435. On the other hand, if the data quality evaluation program module 220 determines that the PK-FK relationship is not known between each involved dataset, then the flow returns to step 420.

Still referring to FIG. 4, at step 435, the computer server 210 builds a new bound rule candidate specifying joins between the different tables involved in the binding. In embodiments, step 435 comprises the data quality evaluation program module 220 of the computer server 210 building the new bound rule candidate specifying joins between the different tables involved in the binding. In particular, if a binding combination involves columns from different tables, the data quality evaluation program module 220 uses the PK-FK relationships discovered at step 405 to determine whether or not there is a possible way to join those tables together. If it is possible to join the tables together, then the data quality evaluation program module 220 adds join criteria to the new bound rule candidate. If it is not possible to joint the tables together, then the data quality evaluation program module 220 drops the new bound rule candidate.

Still referring to FIG. 4, at step 440, the computer server 210, selects the next rule variable and its corresponding column binding candidate. In embodiments, step 440 comprises the data quality evaluation program module 220 of the computer server 210 selecting the next rule variable and its corresponding column binding candidate from the new bound rule candidate built at step 435.

Figure 6:
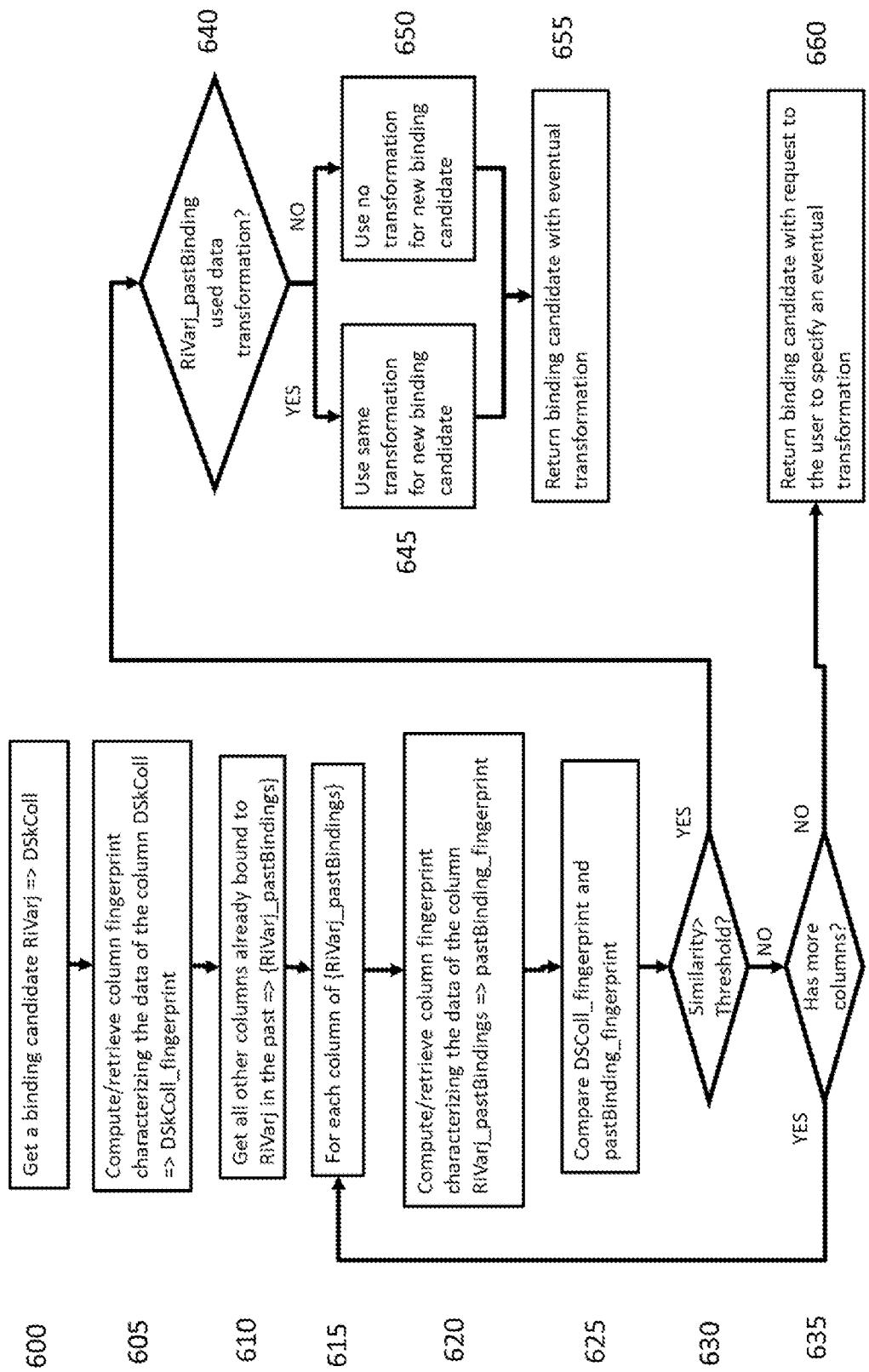

Still referring to FIG. 4, at step 445, the computer server 210 determines whether or not the same rule variable was already bound to a column with similar data in the past. In embodiments, step 405 comprises the data quality evaluation program module 220 of the computer server 210 determining whether or not the same rule variable was already bound to a column with similar data in the past, as illustrated in FIG. 6. If the data quality evaluation program module 220 determines that the same rule variable was already bound to a column with similar data in the past, then the flow proceeds to step 455. On the other hand, if the data quality evaluation program module 220 determines that the same rule variable was not already bound to a column with similar data in the past, then the flow proceeds to step 450.

Still referring to FIG. 4, at step 450, the computer server 210 ask the user to specify a data transformation. In embodiments, step 450 comprises the data quality evaluation program module 220 of the computer server 210 asking the user to specify the data transformation via the data quality evaluation user interface program module 245 of the user computing device 240.

Still referring to FIG. 4, at step 455, the computer server 210 specifies a similar transformation in the new rule for the same variable. In embodiments, step 455 comprises the data quality evaluation program module 220 of the computer server 210 specifies a similar transformation in the new rule for the same variable based on the previous binding (determined at step 445).

Still referring to FIG. 4, at step 460, the computer server 210 determines whether or not there are more variables. In embodiments, step 460 comprises the data quality evaluation program module 220 of the computer server 210 determining whether or not there are more variables that have not yet been selected at step 440. If the data quality evaluation program module 220 determines that there are more variables, then the flow returns to step 440. On the other hand, if the data quality evaluation program module 220 determines that there are not more variables, then the flow proceeds to step 465.

Still referring to FIG. 4, at step 465, the computer server 210 saves the new bound rule. In embodiments, step 465 comprises the data quality evaluation program module 220 of the computer server 210 saving the new bound rule in the storage 225 of the computer server 210.

Still referring to FIG. 4, at step 470, the computer server 210 determines whether or not there are more combinations. In embodiments, step 470 comprises the data quality evaluation program module 220 of the computer server 210 determining whether or not there are more combinations that have not yet been selected at step 420. If the data quality evaluation program module 220 determines that there are more combinations, then the flow returns to step 420. On the other hand, if the data quality evaluation program module 220 determines that there are not more variables, then the flow proceeds to step 475.

Still referring to FIG. 4, at step 475, the computer server 210 determines whether or not there are more rule expressions. In embodiments, step 405 comprises the data quality evaluation program module 220 of the computer server 210 determining whether or not there are more rule expressions that have not yet been selected at step 415. If the data quality evaluation program module 220 determines that there are more rule expressions, then the flow returns to step 415. On the other hand, if the data quality evaluation program module 220 determines that there are not more rule expressions, then the flow proceeds to step 480.

Still referring to FIG. 4, at step 480, the computer server 210 returns the list of new rules. In embodiments, step 480 comprises the data quality evaluation program module 220 of the computer server 210 returning the list of new bound rules (i.e., the list including all of the new bound rules saved at step 465) to the data quality evaluation user interface program module 245 of the user computing device 240. Optionally, the data quality evaluation program module 220 evaluates each of the rules in the list of new rules against the data stored in one or more of the databases 230-1, 230-2, . . . , 230-n and provides a result of the rule execution to the data quality evaluation user interface program module 245 of the user computing device 240.

FIG. 5 depicts a flowchart of an exemplary method performed by the data quality evaluation program module 220 of the computer server 210 to search for all new binding candidates between the columns of {DSi} and the variables of {Ri}, at step 410 of FIG. 4, in accordance with aspects of the invention. The steps of the method are performed in the environment of FIG. 2 and are described with reference to the elements shown in FIG. 2.

At step 500, the computer server 210 initializes an empty list bindingCandidates={ }. In embodiments, step 500 comprises the data quality evaluation program module 220 of the computer server 210 initializing the empty list bindingCandidates={ }.

Still referring to FIG. 5, at step 505, the computer server 210 selects a next rule expression Ri from a list of rule expressions. In embodiments, step 505 comprises the data quality evaluation program module 220 of the computer server 210 selecting the next rule expression Ri from the list of rule expressions.

Still referring to FIG. 5, at step 510, the computer server 210 selects a next variable RiVarj from a list of variables of Ri. In embodiments, step 510 comprises the data quality evaluation program module 220 of the computer server 210 selecting the next variable RiVarj from the list of variables of Ri.

Still referring to FIG. 5, at step 515, the computer server 210 selects a next data set DSk from a list of data sets. In embodiments, step 515 comprises the data quality evaluation program module 220 of the computer server 210 selecting the next data set DSk from the list of data sets.

Still referring to FIG. 5, at step 520, the computer server 210 selects a next column DSkColl from a list of columns of DSk. In embodiments, step 520 comprises the data quality evaluation program module 220 of the computer server 210 selecting the next column DSkColl from the list of columns of DSk.

Still referring to FIG. 5, at step 525, the computer server 210 determines whether or not RiVarj and DSkColl have similar names. In embodiments, step 525 comprises the data quality evaluation program module 220 of the computer server 210 determining whether or not RiVarj and DSkColl have similar names. If the data quality evaluation program module 220 determines that RiVarj and DSkColl have similar names, then the flow proceeds to step 565. On the other hand, if the data quality evaluation program module 220 determines that RiVarj and DSkColl do not have similar names, then the flow proceeds to step 530.

Still referring to FIG. 5, at step 530, the computer server 210 determines whether or not DSkColl is associated to a term with a name similar to RiVarj. In embodiments, step 530 comprises the data quality evaluation program module 220 of the computer server 210 determining whether or not DSkColl is associated to a term with a name similar to RiVarj. If the data quality evaluation program module 220 determines that DSkColl is associated to a term with a name similar to RiVarj, then the flow proceeds to step 565. On the other hand, if the data quality evaluation program module 220 determines that DSkColl is not associated to a term with a name similar to RiVarj, then the flow proceeds to step 535.

Still referring to FIG. 5, at step 535, the computer server 210 determines whether or not DSkColl is associated to a class with a name similar to RiVarj. In embodiments, step 535 comprises the data quality evaluation program module 220 of the computer server 210 determining whether or not DSkColl is associated to a class with a name similar to RiVarj. If the data quality evaluation program module 220 determines that DSkColl is associated to a class with a name similar to RiVarj, then the flow proceeds to step 565. On the other hand, if the data quality evaluation program module 220 determines that DSkColl is not associated to a class with a name similar to RiVarj, then the flow proceeds to step 540.

Still referring to FIG. 5, at step 540, the computer server 210 determines whether or not DSkColl is associated to a term which is also associated to a policy associated to Ri. In embodiments, step 540 comprises the data quality evaluation program module 220 of the computer server 210 determining whether or not DSkColl is associated to a term which is also associated to a policy associated to Ri. If the data quality evaluation program module 220 determines that DSkColl is associated to a term which is also associated to a policy associated to Ri, then the flow proceeds to step 565. On the other hand, if the data quality evaluation program module 220 determines that DSkColl is not associated to a term which is also associated to a policy associated to Ri, then the flow proceeds to step 550.

Still referring to FIG. 5, at step 550, the computer server 210 determines whether or not DSkColl is associated to a term which is also associated to another column already bound to RiVarj. In embodiments, step 550 comprises the data quality evaluation program module 220 of the computer server 210 determining whether or not DSkColl is associated to a term which is also associated to another column already bound to RiVarj. If the data quality evaluation program module 220 determines that DSkColl is associated to a term which is also associated to another column already bound to RiVarj, then the flow proceeds to step 565. On the other hand, if the data quality evaluation program module 220 determines that DSkColl is not associated to a term which is also associated to another column already bound to RiVarj, then the flow proceeds to step 555.

Still referring to FIG. 5, at step 555, the computer server 210 determines whether or not DSkColl has a name similar to that of another column already bound to RiVarj. In embodiments, step 555 comprises the data quality evaluation program module 220 of the computer server 210 determining whether or not DSkColl has a name similar to that of another column already bound to RiVarj. If the data quality evaluation program module 220 determines that DSkColl has a name similar to that of another column already bound to RiVarj, then the flow proceeds to step 565. On the other hand, if the data quality evaluation program module 220 determines that DSkColl does not have a name similar to that of another column already bound to RiVarj, then the flow proceeds to step 560.

Still referring to FIG. 5, at step 560, the computer server 210 determines whether or not DSkColl contains data similar to the data contained by another column already bound to RiVarj. In embodiments, step 560 comprises the data quality evaluation program module 220 of the computer server 210 determining whether or not DSkColl contains data similar to the data contained by another column already bound to RiVarj. If the data quality evaluation program module 220 determines that DSkColl contains data similar to the data contained by another column already bound to RiVarj, then the flow proceeds to step 565. On the other hand, if the data quality evaluation program module 220 determines that DSkColl does not contain data similar to the data contained by another column already bound to RiVarj, then the flow proceeds to step 570.

Still referring to FIG. 5, at step 565, the computer server 210 adds (RiVarj=>DSkColl) to bindingCandidates. In embodiments, step 565 comprises the data quality evaluation program module 220 of the computer server 210 adding (RiVarj=>DSkColl) to bindingCandidates.

Still referring to FIG. 5, at step 570, the computer server 210 determines whether or not there are more columns that have not been selected at step 520. In embodiments, step 570 comprises the data quality evaluation program module 220 of the computer server 210 determining whether or not there are more columns that have not been selected at step 520. If the data quality evaluation program module 220 determines that there are more columns that have not been selected at step 520, then the flow returns to step 520. On the other hand, if the data quality evaluation program module 220 determines that there are not more columns that have not been selected at step 520, then the flow proceeds to step 575.

Still referring to FIG. 5, at step 575, the computer server 210 determines whether or not there are more datasets that have not been selected at step 515. In embodiments, step 575 comprises the data quality evaluation program module 220 of the computer server 210 determining whether or not there are more datasets that have not been selected at step 515. If the data quality evaluation program module 220 determines that there are more datasets that have not been selected at step 515, then the flow returns to step 515. On the other hand, if the data quality evaluation program module 220 determines that there are not more datasets that have not been selected at step 515, then the flow proceeds to step 580.

Still referring to FIG. 5, at step 580, the computer server 210 determines whether or not there are more variables that have not been selected at step 510. In embodiments, step 580 comprises the data quality evaluation program module 220 of the computer server 210 determining whether or not there are more variables that have not been selected at step 510. If the data quality evaluation program module 220 determines that there are more variables that have not been selected at step 510, then the flow returns to step 510. On the other hand, if the data quality evaluation program module 220 determines that there are not more variables that have not been selected at step 510, then the flow proceeds to step 585.

Still referring to FIG. 5, at step 585, the computer server 210 determines whether or not there are more rule expressions that have not been selected at step 505. In embodiments, step 585 comprises the data quality evaluation program module 220 of the computer server 210 determining whether or not there are more rule expressions that have not been selected at step 505. If the data quality evaluation program module 220 determines that there are more rule expressions that have not been selected at step 505, then the flow returns to step 505. On the other hand, if the data quality evaluation program module 220 determines that there are not more rule expressions that have not been selected at step 505, then the flow proceeds to step 590.

Still referring to FIG. 5, at step 590, the computer server 210 returns the bindingCandidates. In embodiments, step 590 comprises the data quality evaluation program module 220 of the computer server 210 returning the bindingCandidates generated at step 565, as the binding candidates in step 410 of FIG. 4.

FIG. 6 depicts a flowchart of an exemplary method performed by the data quality evaluation program module 220 of the computer server 210 to determine whether or not the same rule variable was already bound to a column with similar data in the past, at step 445 of FIG. 4, in accordance with aspects of the invention. The steps of the method are performed in the environment of FIG. 2 and are described with reference to the elements shown in FIG. 2.

At step 600, the computer server 210 gets a binding candidate RiVarj=>DSkColl. In embodiments, step 600 comprises the data quality evaluation program module 220 of the computer server 210 getting a binding candidate RiVarj=>DSkColl.

Still referring to FIG. 6, at step 605, the computer server 210 computes/retrieves a column fingerprint characterizing the data of the column DSkColl=>DSkColl fingerprint. In embodiments, step 605 comprises the data quality evaluation program module 220 of the computer server 210 computing/retrieving the column fingerprint characterizing the data of the column DSkColl=>DSkColl fingerprint.

Still referring to FIG. 6, at step 610, the computer server 210 gets all other columns already bound to RiVarj in the past=>{RiVarj_pastBindings}. In embodiments, step 610 comprises the data quality evaluation program module 220 of the computer server 210 getting all other columns already bound to RiVarj in the past=>{RiVarj_pastBindings}.

Still referring to FIG. 6, at step 615, the computer server 210 selects a next column from a list of columns of {RiVarj_pastBindings}. In embodiments, step 615 comprises the data quality evaluation program module 220 of the computer server 210 selecting the next column from a list of columns of {RiVarj_pastBindings}.

Still referring to FIG. 6, at step 620, the computer server 210 computes/retrieves a column fingerprint characterizing the data of the column RiVarj_pastBindings=>pastBinding_fingerprint. In embodiments, step 620 comprises the data quality evaluation program module 220 of the computer server 210 computing/retrieveing a column fingerprint characterizing the data of the column RiVarj_pastBindings=>pastBinding_fingerprint.

Still referring to FIG. 6, at step 625, the computer server 210 compares DSColl_fingerprint and pastBinding_fingerprint. In embodiments, step 625 comprises the data quality evaluation program module 220 of the computer server 210 comparing DSColl_fingerprint and pastBinding_fingerprint.

Still referring to FIG. 6, at step 630, the computer server 210 determines whether or not similarity>threshold. In embodiments, step 630 comprises the data quality evaluation program module 220 of the computer server 210 determining whether or not similarity>threshold. If the data quality evaluation program module 220 determines that similarity>threshold, then the flow proceeds to step 640. On the other hand, if the data quality evaluation program module 220 determines that it is not the case that similarity>threshold, then the flow proceeds to step 635.

Still referring to FIG. 6, at step 635, the computer server 210 determines whether or not there are more columns that have not been selected at step 615. In embodiments, step 635 comprises the data quality evaluation program module 220 of the computer server 210 determining whether or not there are more columns that have not been selected at step 615. If the data quality evaluation program module 220 determines that there are more columns that have not been selected at step 615, then the flow returns to step 615. On the other hand, if the data quality evaluation program module 220 determines that it is not the case there are more columns that have not been selected at step 615, then the flow proceeds to step 660.

Still referring to FIG. 6, at step 640, the computer server 210 determines whether or not RiVarj_pastBinding used data transformation. In embodiments, step 640 comprises the data quality evaluation program module 220 of the computer server 210 determining whether or not RiVarj_pastBinding used data transformation. If the data quality evaluation program module 220 determines that RiVarj_pastBinding used data transformation, then the flow proceeds to step 645. On the other hand, if the data quality evaluation program module 220 determines that RiVarj_pastBinding did not use data transformation, then the flow proceeds to step 650.

Still referring to FIG. 6, at step 645, the computer server 210 uses the same transformation for new binding candidate. In embodiments, step 645 comprises the data quality evaluation program module 220 of the computer server 210 using the same transformation as RiVarj_pastBinding for the new binding candidate.

Still referring to FIG. 6, at step 650, the computer server 210 uses no transformation for the new binding candidate. In embodiments, step 650 comprises the data quality evaluation program module 220 of the computer server 210 using no transformation for new binding candidate.

Still referring to FIG. 6, at step 655, the computer server 210 returns the binding candidate with the eventual transformation. In embodiments, step 655 comprises the data quality evaluation program module 220 of the computer server 210 returning the binding candidate with the eventual transformation to step 445 of FIG. 4.

Still referring to FIG. 6, at step 660, the computer server 210 returns the binding candidate with a request to the user to specify an eventual transformation. In embodiments, step 660 comprises the data quality evaluation program module 220 of the computer server 210 returning binding candidate to step 445 of FIG. 4, and asking the user to specify the data transformation at step 450 of FIG. 4.

FIGS. 7, 8, 9, 10, and 11 depict examples in accordance with aspects of the invention. FIG. 7 depicts an example of use of a term in accordance with aspects of the invention. In particular, table 700 shows pairs of business terms and column names that are available in the data catalog. Rule expressions 710 have identical variable names, either to the term or to the column. In embodiments, using Levenshtein or similar methods, the terms First Name, Last Name, and Zip Code in table 700 are matched with the bolded variable names in the rule expressions 710.

FIG. 8 depicts an example of use of a data class in accordance with aspects of the invention. In particular, in this example, the enterprise does not have a well-defined glossary but the enterprise uses data classes. Table 800 shows data class names and column names with which the data classes are associated. In embodiments, fuzzy matching is used to determine that ID and Country Code in the table 800 match the corresponding bolded variables in the rule expressions 810.

FIG. 9 depicts an example of use of a column name in accordance with aspects of the invention. In particular, in this example, table 900 is ingested. In embodiments, groups of columns in the table 900 are used together with their matched variables in rule expressions 910 to suggest possible bindings.

FIG. 10 depicts an example of use of associations between policies and rule expressions in accordance with aspects of the invention. In particular, in this example, embodiments associate rule expressions using associations of terms and policies 1000 and policies and rule expressions 1010. Using the triangle of term, policy, and rule expression when applied to columns, embodiments suggest the same rule expression to columns under investigation if they share term and policy.

FIG. 11 depicts an example of determining particular binding logic in accordance with aspects of the invention. In particular, in this example, embodiments find for a given column three possible rules, shown in the rule expression column of table 1100. Using groupings, embodiments find clusters of columns where each of these expressions is bound. Embodiments then use fingerprints to determine data similarities, wherein if the new column is of type integer, it will be similar to a first group, if type string then a second group, and if type date a third group.

Accordingly, it is understood from the foregoing description that embodiments of the invention provide methods and systems that automate bindings in a data rule based on a transitivity relation between the variables in the rule, business glossary terms or data classes, and the columns of data being ingested. Embodiments then take into account data type and if the rule definition can be bound to the data type and automatically bind or suggest feedback to the rule developer to automate the process.

Accordingly, it is understood from the foregoing description that embodiments of the invention provide methods and systems that suggest and automatically bind rule variables to dataset columns in order to enforce a business requirement on ingested data. In embodiments, results from prior bindings are used to automatically (or manually) predict relationships between terms and/or data classes, columns, and variables. In embodiments, fuzzy matching is used between variable names and terms as well as data type and pattern of variables and data classes to predict relationships between variables and terms and/or data classes. In embodiments, these relationship are compared with columns that are already assigned terms and/or data classes and bindings are created if their data types match. If not, in embodiments, edits to the original rule are suggested.

Additionally, in embodiments, prior bindings are used to generate a relationship between the rule variable and term or data class that was assigned to the column that was bound to it. Furthermore, in embodiments, the final binding is produced based on a match between the data type of the variable and the column, or feedback is suggested to a developer of rule expressions to create a new rule expression or modify the existing rule expression so that it may be applied to the matching columns.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computing device, at least one data set and a list of rule expressions wherein each of the rule expressions comprises a logical expression configured to be bound to a column of data, thereby applying the logical expression to the data during data analysis;
   determining, by the computing device, based on rule expressions historically applied to data columns in one or more databases, a cluster of columns to which a first rule expression is applied;
   building, by the computing device, candidate binding combinations between columns of the at least one data set and variables of each rule expression in the list of rule expressions, wherein the candidate binding combinations include a suggestion to bind a first one of the columns and the first rule expression;
   determining, by the computing device, whether the first one of the columns matches one of the columns in the cluster of columns by comparing characteristics of the columns in the cluster of columns with characteristics of the first one of the columns;
   building, by the computing device, a new bound rule expression candidate for the first one of the columns based on the candidate binding combinations and the comparing, wherein the new bound rule expression candidate suggests binding the first rule expression to the first one of the columns;
   generating, by the computing device, a new bound rule expression based on the new bound rule expression candidate that binds the first rule expression to the first one of the columns, wherein the new bound rule expression specifies a data transformation applied to the first one of the columns; and
   storing, by the computing device, the new bound rule expression.

2. The method according to claim 1, further comprising evaluating, by the computing device, the new bound rule expression against data stored in the at least one data set.

3. The method according to claim 1, further comprising discovering, by the computing device, primary key to foreign key relationships in the at least one data set, and wherein the building the new bound rule expression candidate comprises:
   determining that one of the candidate binding combinations involves columns from different tables;
   determining join criteria for joining the columns from the different tables together based on the discovered primary key to foreign key relationships; and
   adding the join criteria to the new bound rule expression candidate.

4. The method according to claim 1, wherein the building the candidate binding combinations between the columns of the at least one data set and the variables of each rule expression in the list of rule expressions comprises determining, by the computing device, similarities between names of the variables of each rule expression in the list of rule expressions and names of the columns of the at least one data set.

5. The method according to claim 1, wherein the building the candidate binding combinations between the columns of the at least one data set and the variables of each rule expression in the list of rule expressions comprises determining, by the computing device, similarities between names of terms associated with the columns of the at least one data set and names of the variables of each rule expression in the list of rule expressions.

6. The method according to claim 1, wherein the building the candidate binding combinations between the columns of the at least one data set and the variables of each rule expression in the list of rule expressions comprises determining, by the computing device, similarities between names of classes associated with the columns of the at least one data set and names of the variables of each rule expression in the list of rule expressions.

7. The method according to claim 1, wherein the building the candidate binding combinations between the columns of the at least one data set and the variables of each rule expression in the list of rule expressions comprises determining, by the computing device, associations of the columns of the at least one data set with same terms as policies associated with rule expressions in the list of rule expressions.

8. The method according to claim 1, wherein the building the candidate binding combinations between the columns of the at least one data set and the variables of each rule expression in the list of rule expressions comprises determining, by the computing device, an association of the first one of the columns of the at least one data set with a same term as a second one of the columns of the at least one data set that is already bound to the first rule expression.

9. The method according to claim 1, wherein the building the candidate binding combinations between the columns of the at least one data set and the variables of each rule expression comprises determining, by the computing device, similarities between a name of the first one of the columns of the at least one data set and a name of a second one of the columns of the at least one data set that is already bound to a variable in the first rule expression.

10. The method according to claim 1, wherein the building the candidate binding combinations between the columns of the at least one data set and the variables of each rule expression comprises determining, by the computing device, similarities between data of the first one of the columns of the at least one data set and data of a second one of the columns of the at least one data set that is already bound to a variable in the first rule expression.

11. A computer program product comprising:
    one or more computer readable storage media, and program instructions collectively stored on the one or more computer readable storage media, the program instructions comprising:
    program instructions to receive at least one data set and a list of rule expressions, wherein each of the rule expressions comprises a logical expression configured to be bound to a column of data, thereby applying the logical expression to the data during data analysis;
    program instructions to determine, based on rule expressions historically applied to data columns in one or more databases, a cluster of columns to which a first rule expression is applied;
    program instructions to build candidate binding combinations between columns of the at least one data set and variables of each rule expression in the list of rule expressions based on similarities between names of the variables of each rule expression in the list of rule expressions and names of the columns of the at least one data set;

program instructions to determine whether a first one of the columns matches one of the columns in the cluster of columns by comparing characteristics of the columns in the cluster of columns with characteristics of the first one of the columns;

program instructions to build a new bound rule expression candidate based on the candidate binding combinations and the comparing;

program instructions to generate a new bound rule expression based on the new bound rule expression candidate that binds the first rule expression to a first one of the columns, wherein the new bound rule expression specifies a data transformation applied to the first one of the columns; and program instructions to evaluate the new bound rule expression against data stored in the at least one data set.

12. The computer program product according to claim 11, further comprising program instructions to discover primary key to foreign key relationships in the at least one data set, wherein the building the new bound rule expression candidate comprises:
    determining that one of the candidate binding combinations involves columns from different tables;
    determining that the different tables are unable to be joined based on the discovered primary key to foreign key relationships; and
    dropping the new bound rule expression candidate.

13. The computer program product according to claim 11, wherein the building the candidate binding combinations between the columns of the at least one data set and the variables of each rule expression is in the list of rule expressions is further based on similarities between names of terms associated with the columns of the at least one data set and names of the variables of each rule expression in the list of rule expressions.

14. The computer program product according to claim 11, wherein the building the candidate binding combinations between the columns of the at least one data set and the variables of each rule expression is in the list of rule expressions is further based on similarities between names of classes associated with the columns of the at least one data set and names of the variables of each rule expression in the list of rule expressions.

15. The computer program product according to claim 11, wherein the building the candidate binding combinations between the columns of the at least one data set and the variables of each rule expression is in the list of rule expressions is further based on associations of the columns of the at least one data set with same terms as policies associated with rule expressions in the list of rule expressions.

16. The computer program product according to claim 11, wherein the building the candidate binding combinations between the columns of the at least one data set and the variables of each rule expression is in the list of rule expressions is further based on an association of the first one of the columns of the at least one data set with a same term as a second one of the columns of the at least one data set that is already bound to a variable in a rule expression in the list of rule expressions.

17. The computer program product according to claim 11, wherein the building the candidate binding combinations between the columns of the at least one data set and the variables of each rule expression is in the list of rule expressions is further based on similarities between a name of the first one of the columns of the at least one data set and a name of a second one of the columns of the at least one data set that is already bound to a variable in a rule expression in the list of rule expressions.

18. The computer program product according to claim 11, wherein the building the candidate binding combinations between the columns of the at least one data set and the variables of each rule expression is in the list of rule expressions is further based on similarities between data of the first one of the columns of the at least one data set and data of a second one of the columns of the at least one data set that is already bound to a variable in a rule expression in the list of rule expressions.

19. A system comprising:
    a processor, a computer readable memory, one or more computer readable storage media, and program instructions collectively stored on the one or more computer readable storage media, the program instructions executable to:
    receive at least one data set and a list of rule expressions, wherein each of the rule expressions comprises a logical expression configured to be bound to a column of data, thereby applying the logical expression to the data during data analysis;
    determine, based on rule expressions historically applied to data columns in one or more databases, a cluster of columns to which a first rule expression is applied;
    build candidate binding combinations between columns of the at least one data set and variables of each rule expression in the list of rule expressions;
    determine whether a first one of the columns matches one of the columns in the cluster of columns by comparing characteristics of the columns in the cluster of columns with characteristics of the first one of the columns;
    build a new bound rule expression candidate based on the candidate binding combinations and the comparing;
    generate a new bound rule expression based on the new bound rule expression candidate that binds the first rule expression to the first one of the columns, wherein the new bound rule expression specifies a data transformation to apply to the first one of the columns; and
    store the new bound rule expression.

20. The system according to claim 19, wherein the data transformation is determined using a fingerprint of the first one of the columns which is automatically generated based on metrics of the first one of the columns including data type, and a fingerprint of the one of the columns in the cluster of columns which is automatically generated based on metrics of the one of the columns in the cluster of columns including data type.

* * * * *